United States Patent [19]

Fraley

[11] Patent Number: 4,712,799

[45] Date of Patent: Dec. 15, 1987

[54] MULTI-SCREEN VIDEO GAMING DEVICE AND METHOD

[75] Inventor: Walter C. Fraley, Carlsbad, Calif.

[73] Assignee: Edwards Manufacturing, Inc., Ontario, Calif.

[21] Appl. No.: 851,278

[22] Filed: Apr. 10, 1986

Related U.S. Application Data

[63] Continuation of Ser. No. 655,350, Sep. 27, 1984, abandoned.

[51] Int. Cl.$^4$ .............................................. A63F 9/22
[52] U.S. Cl. ............................. 273/138 A; 273/85 G; 273/DIG. 28
[58] Field of Search ............... 273/1 E, 85 G, 138 A, 273/143 R, DIG. 28; 340/323 R

[56] References Cited

U.S. PATENT DOCUMENTS

| | | | |
|---|---|---|---|
| 4,099,722 | 7/1978 | Rodesch et al. | 273/143 R |
| 4,189,728 | 2/1980 | Stubben | 273/DIG. 28 |
| 4,238,127 | 12/1980 | Lucero et al. | 273/143 R |
| 4,240,635 | 12/1980 | Brown | 273/138 A |
| 4,299,388 | 11/1981 | Resch et al. | 273/143 R |
| 4,321,673 | 3/1982 | Hawwass et al. | 364/412 |
| 4,324,401 | 4/1982 | Stubben et al. | 273/DIG. 28 |
| 4,335,809 | 6/1982 | Wain | 194/1 R |
| 4,353,554 | 10/1982 | Fisher | 273/143 R |
| 4,421,310 | 12/1983 | Williams | 273/138 A |
| 4,648,600 | 3/1987 | Olliges | 273/138 A |

FOREIGN PATENT DOCUMENTS

2098778 11/1982 United Kingdom ............ 273/143 R

Primary Examiner—Richard C. Pinkham
Assistant Examiner—MaryAnn S. Lastova
Attorney, Agent, or Firm—Brown, Martin, Haller & Meador

[57] ABSTRACT

A gaming device employs a plurality of video displays, each presenting an output consisting of gaming symbols which are scrolled to simulate the effect of a revolving mechanical reel. The device includes electronic circuitry effectively storing, for each video display, an electronic signal sequence corresponding to a sequence of gaming symbols which is scrolled on the associated video display. Each electronic symbol sequence consists of a series of separate, sequentially-addressable sectors of electronic data storage, each sector containing a sequence of symbol addresses which access a single, common symbol signal storage space containing the symbols which occur in all of the presented sequences. A symbol sequence is scrolled by randomly selecting a starting symbol, sequentially addressing, from the starting symbol, the symbols defined by the symbol addresses in the reel for a predetermined period of time during which the reel rotates, and then halting the rotation at a stopping symbol. The scrolling effect is enhanced by presenting the output of each video display at a common frame rate and changing the location of a displayed symbol by a predetermined amount each frame.

16 Claims, 11 Drawing Figures

MULTI-SCREEN VIDEO GAMING DEVICE AND METHOD

This is a continuation of application Ser. No. 655,350 filed Sept. 27, 1984, now abandoned.

BACKGROUND OF THE INVENTION

The present invention relates to electronic gaming devices and, more specifically, to an electronic-slot-machine-type gaming device using plural video screens to produce video outputs simulating the revolution of symbol-bearing reels in a mechanical slot machine.

As is known, manual slot machines provide a display produced by the motions of sequences of figures contained on the peripheries of rotatable mechanical reels. The reels are simultaneously set in motion when a coin is placed in the slot machine and a gaming attempt initiated by pulling a lever or pressing a switch. The outcome of the gaming attempt is determined by the combination of figure produced in a display area when the rotating reels are randomly stopped.

A great many slot machines using such reels employ electronic means to initiate and randomly stop the rotations of the reels. Other electronic slot machines use plural respective optical matrices to display gaming symbols which are randomly produced in response to a gaming attempt.

However, presently there are no electronic slot machines incorporating electronic video displays to produce outputs that simulate the action of randomly-stopped rotating image reels.

Therefore it is an object of the present invention to provide an electronic gaming device incorporating a plurality of electronic video displays to simulate the operation of randomly-stopped rotating image reels in mechanical slot machines.

It is a further object of the present invention to provide an electronic gaming device having video displays which are simultaneously activated to produce visual outputs simulating rotating symbol reels by the provision of symbol signals obtained from a single addressable symbol storage space.

A further object of the present invention is to provide, in such a gaming device and for each display, a symbol reel circuit that automatically obtains stored symbol signals effective for displaying a rotating sequence of gaming symbols.

A further object of the present invention is to provide a gaming apparatus in which a single timing and synchronization circuit orchestrates the operations of plural symbol reel circuits and plural video displays to simulate the randomly-stopped rotating of plural mechanical symbol reels.

SUMMARY OF THE INVENTION

The present invention accomplishes these objectives by providing a plurality of identical symbol reel circuits, each associated with a respective electronic display device and storing address information which defines a repeating sequence of gaming symbols to be presented by the associated display device. The symbol reel circuits are operated to synchronously provide their stored reel address information to a single symbol memory circuit storing symbol signals that define all of the gaming symbols to be displayed during rotation of the reels. The address information provided by each symbol reel circuit causes the symbol memory to provide symbols signals stored at the addressed location. Routing circuitry then guides symbol signals addressed by each symbol reel circuit to the associated video display device. The result is, for each display device, a stream of successive symbol signals which cause the display device to present an apparently-reeling succession of gaming symbols.

The video gaming device of the invention presents plural, movable symbols in sequences that are stopped by the device to indicate the result of the gaming attempt. The symbol sequences are presented on plural scanned video output devices, each for displaying a respective rotating symbol sequence in response to a corresponding sequence of symbol signals. A control processor randomly selects a symbol included in a rotating symbol sequence and, based upon the randomly-selected signal, provides a spin signal to initiate, continue and then randomly stop rotation of the symbol sequence. The invention further includes, associated with each video output device, a reel circuit means which stores a reel signal sequence corresponding to a predetermined rotating symbol sequence and which responds to a spin signal by providing a portion of its stored reel signal sequence. A single symbol storage circuit stores symbol signals corresponding to a plurality of gaming symbols that are contained in the rotating symbol sequences and responds to a sequence of reel signals by providing, to the video display associated with the reel circuit providing the reel signal sequence, the sequence of symbol signals determined by the reel signal sequence.

The invention further includes circuitry for synchronizing the operations of the video displays, the control processor, and the plural reel circuits so that the scanning operation of each video display is coordinated with the provision of a respective symbol signal sequence.

As the following description of the invention is read in conjunction with the below-described drawings, it will be appreciated that, in addition to the objectives and benefits described hereinabove, the invention accomplishes other ends and provides further advantages.

DETAILED DESCRIPTION OF THE PREFERRED EMBODIMENT

Figure 1A:
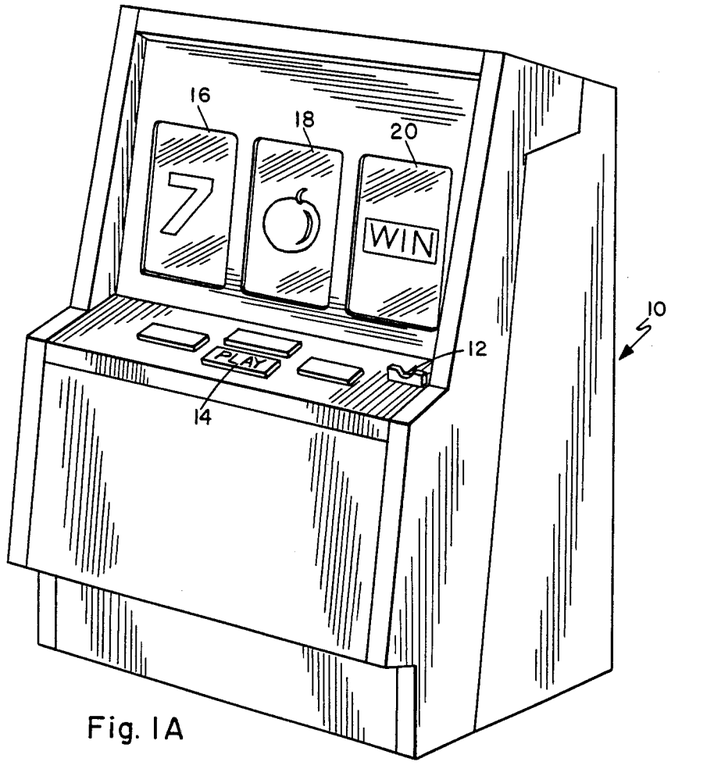
FIG. 1A is a front view of a slot machine constructed according to the invention.

Reference is now made to FIG. 1A of the drawings where there is illustrated a slot machine 10 constructed to operate in accordance with the invention. As is conventional, the slot machine 10 permits a patron to make a gaming attempt by depositing one or more coins or tokens into a slot 12 and depressing a gaming play actuator such as a button 14. As is typical, when a coin deposit has been followed by a play actuation, a plurality of separate symbol reels are caused to rotate, with the outcome of the gaming attempt determined by the alignment of signals resulting when the rotation of each symbol reel has been randomly interrupted. The invention permits the rotating symbol reels to be simulated in the displays presented by video output devices 16–20.

Preferably, each of the devices 16–20 comprises a conventional, high-quality scanned CRT device having a screen where the symbol sequences are displayed. Each scanned device presents on its screen a two-dimensional display including 65,536 individual pixels arranged in a 256×256 matrix. As is typical, each video device presents its pixel array in a scanned format which is completely presented 60 times per second, with each presentation being referred to as a frame. In keeping with further convention, the pixel matrix presented in each frame contains 256 parallel lines, each containing 256 individual pixels. Further, each frame is defined in time by a vertical synchronization (VSYNCH) signal. Additionally, within the time sector defined by two successive VSYNCH signals, 256 consecutive horizontal synchronization (HSYNCH) signals occur, each defining the beginning of a 256 pixel line.

Figure 1B:
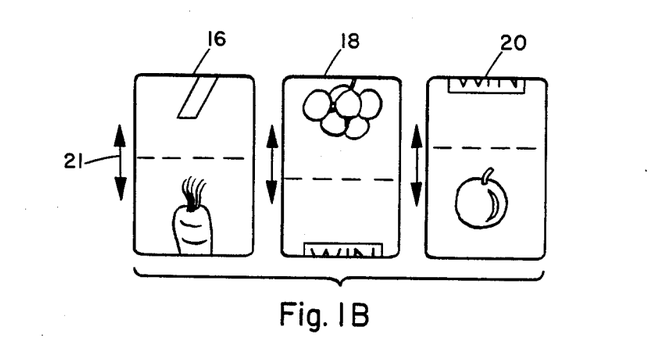
FIG. 1B illustrates the operation of the invention in presenting three parallel rotating sequences of gaming symbols on the three displays of the slot machine of FIG. 1A.

In FIG. 1B the operation of the video devices 16–20 in simulating spinning slot machine reels is illustrated. As is known, a spinning slot machine reel has a broadened periphery on which a sequence of gaming symbols is inscribed. The gaming patron views the peripheries of the wheels through fixed viewing windows so that when the wheels spin each presents a succession of gaming symbols. The screens of the video devices 16–20 simulate three parallel rotatable symbol reels. In, for example, video device 16, an image reel sequence is simulated by moving a sequence of displayed images in either vertical direction across the screen as indicated by the doubleheaded vertical arrow 21.

This movement is simulated in the invention by storing symbol signals which drive the display mechanism of the device 16 in a memory which is addressed to provide the symbols in the sequence desired. For example, in the display of the device 16, the symbol portion displayed across the top of the screen is held in a symbol storage sector having a set of addresses which are lower than the sector storing the symbol portion at the bottom of the screen. In the next following frame all of the addresses for the symbol storage are incremented by a predetermined amount so that the vertical location of the symbol is changed in the succeeding frame by a vertical distance corresponding to the predetermined address change. Since the frames change more quickly than the eye can detect, there is created the illusion of vertical movement.

Figure 2:
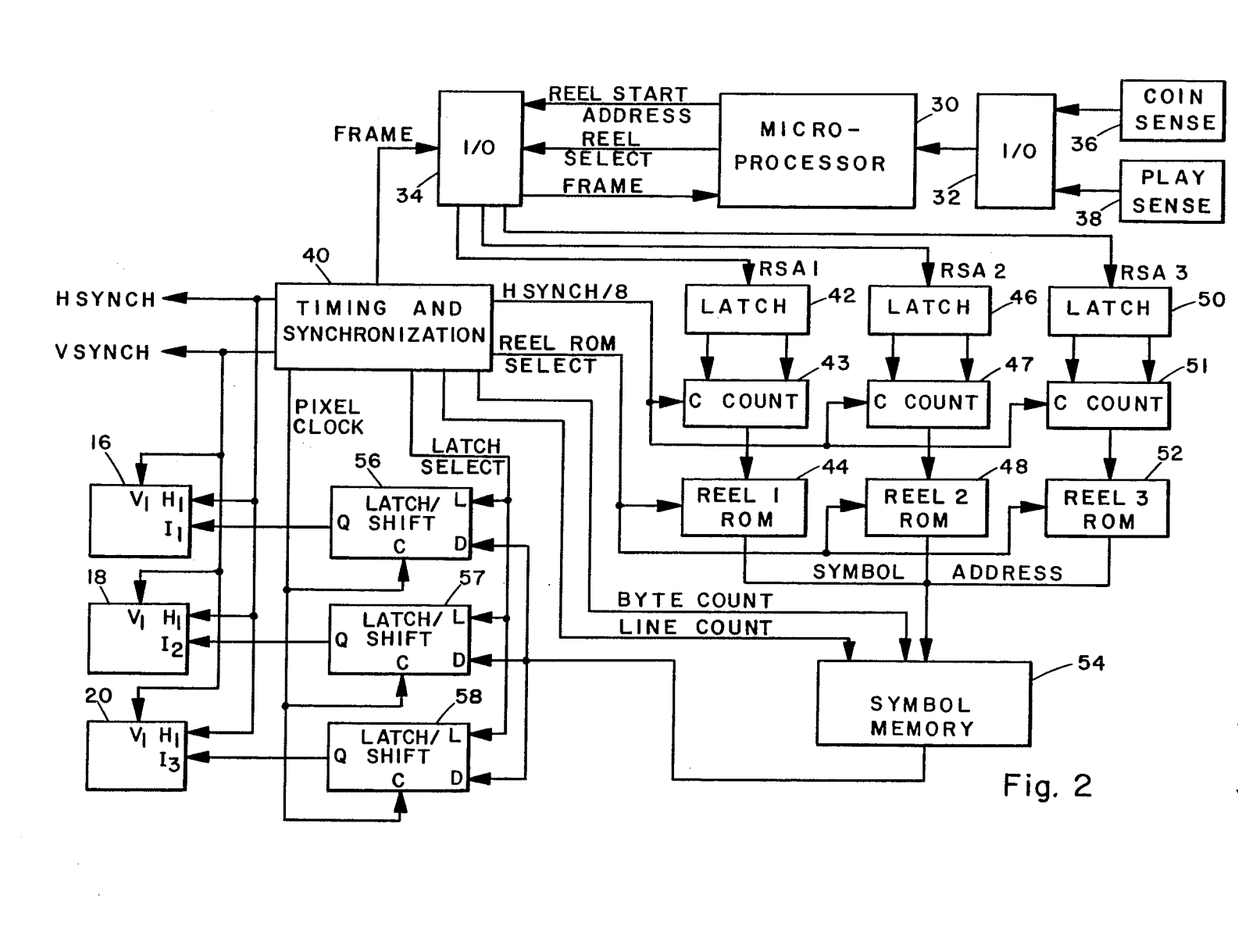
FIG. 2 is a block diagram illustrating the interconnection of the major electronic elements of the invention.

To produce the illusion of a rotating symbol reel on each of the video devices 16–20 according to the invention, the slot machine 10 is constructed in part according to the block diagram of FIG. 2. In FIG. 2 a conventional microprocessor system 30 is connected to a pair of conventional I/O expanders 32 and 34. The processor 30 receives, through the expander 32, electronic signals from a conventional coin sensing apparatus 36 that indicate when coins are dropped into the slot 12. The expander 32 also forwards signals from a play switch sensor 38 when a patron depresses the play switch 14 to initiate a gaming attempt.

A timing and synchronization circuit 40 provides the VSYNCH and HSYNCH signals described above and also a FRAME signal which marks the transition between the end of a completed video frame and the beginning of the next following frame to be presented on each of the video devices 16–20. The FRAME signal is passed through the expander 34 to the processor 30. In response to the FRAME signal, the processor 30 provides a respective reel start address (RSA) signal to each of three symbol reel circuits.

A first symbol reel circuit includes conventional circuitry consisting of a digital latch 42, an 8-bit counter 43, and a read only memory (ROM) 44. A second identical symbol reel circuit includes latch 46, counter 47, and ROM 48, while a third identical symbol reel circuit includes latch 50, counter 51, and ROM 52. Each of the symbol reel circuits receives a respective one of the RSA signals which is captured in the circuit's latch and passed when that latch is enabled by a respective REEL SELECT signal from the processor 30 uniquely identifying the latch. The latched RSA signal is passed from its respective latch to the circuit's counter. Each of the counters is enabled to count by the provision of an HSYNCH/8 signal from the timing and synchronization circuit 40. The HSYNCH/8 signal divides the period between successive HSYNCH signals into eight equal time periods. Therefore, the count in each counter is incremented eight times for each horizontal line scanned during a video frame. It should be evident that 32 pixels in a line will be scanned between each change in the count of one of the counters 43, 47, and 51.

Each of the reel ROM's 44, 48, and 52 are enabled by a respective REEL ROM SELECT signal provided from the timing and synchronization circuit 40. Each time a reel ROM is enabled it provides symbol address information in the form of a SYMBOL ADDRESS signal, described further below, which is stored at the storage location indicated by the current count of the counter to which it is connected.

The respective SYMBOL ADDRESS signals output by each of the reel ROM's 44, 48 and 52 are each combined with a BYTE COUNT signal output by the timing and synchronization circuit 40 to provide a first set of address portions to a conventional electronic symbol memory 54. A second set of address portions are provided on the signal path labelled LINE COUNT by the circuit 40 to the memory 54.

The output of the symbol memory 54 is connected to the data input ports of three identical circuits 56-58 which latch data output in parallel by the symbol memory 54 and shift the latched data serially to the video display devices 16-20, respectively. Each of the circuits 56-58 is enabled to latch data output by the memory 54 by the provision of a respective LATCH SELECT signal from the circuit 40. The latched data are shifted out of the circuits serially by the provision of a PIXEL CLOCK signal, a conventional digital timing signal which oscillates at the frequency with which pixels are displayed on the video devices 16-20. Conventionally the PIXEL CLOCK signal oscillates at approximately 3.9 MHz.

The data shifted from the latch/shift circuits 56-58 are provided from the Q port of the circuits of the video signal input (I) ports of the video devices 16-20. As is conventional, the I port of a video device can comprise the port on a typical CRT through which one or more composite input video signals are fed to activate the display. Each of the devices 16-20 also includes conventional V and H ports which receive the VSYNCH and HSYNCH signals, respectively, to synchronize conventional internal scanning circuitry that enables the device to display the input signal in the scanned two-dimensional format described above.

Figure 3:
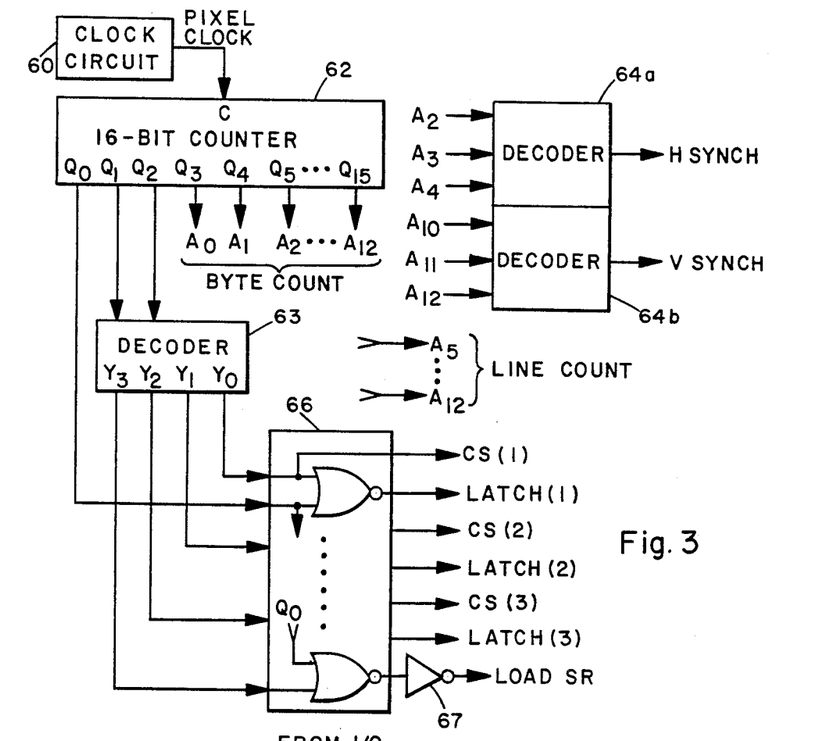
FIG. 3 is a functional block diagram illustrating in greater detail the timing and synchronization circuit of the FIG. 2 diagram.

With reference now to FIG. 3, the timing and synchronization circuit 40 of FIG. 2 will be explained in greater detail. The circuit 40 includes a conventional oscillatory video clocking circuit 60 which provides the PIXEL CLOCK signal. The PIXEL CLOCK signal is fed to the clock (C) port of a conventional 16-bit digital counter 62 whose output is available at ports $Q_0$-$Q_{15}$. The counter 62 counts cyclically in a conventional digital manner through 65,536 states, each defining a pixel location on each of the three video devices 16-20. The least significant bits (LSB's) are available from ports $Q_0$-$Q_2$. The next thirteen most significant bits (MSB's) are available at counter output ports $Q_3$-$Q_{15}$. The thirteen MSB's are labelled $A_0$-$A_{12}$. The LSB's available from ports $Q_1$ and $Q_2$ are fed to a conventional decoder 63. The MSB's $A_2$-$A_4$ feed a decoder 64a, while the MSB's $A_{10}$-$A_{12}$ feeds a conventional decoder 64b. The decoder 64a produces the HSYNCH signal when $A_2$-$A_4$ are all positive, which occurs each time the counter 62 counts 256 consecutive pulses of the PIXEL CLOCK signal. The VSYNCH signal occurs once every 65,536 pixel clock pulses.

The output of the decoder 63 is fed to an array of NOR gates 66 which is used to develop chip select signals CS(1)-CS(3) and latching signals LATCH(1)-LATCH(3). In addition, the output of one NOR gate of the array 66 is inverted at inverter 67 to provide a signal LOAD SR, which is used to load shift registers described below.

Figure 4:
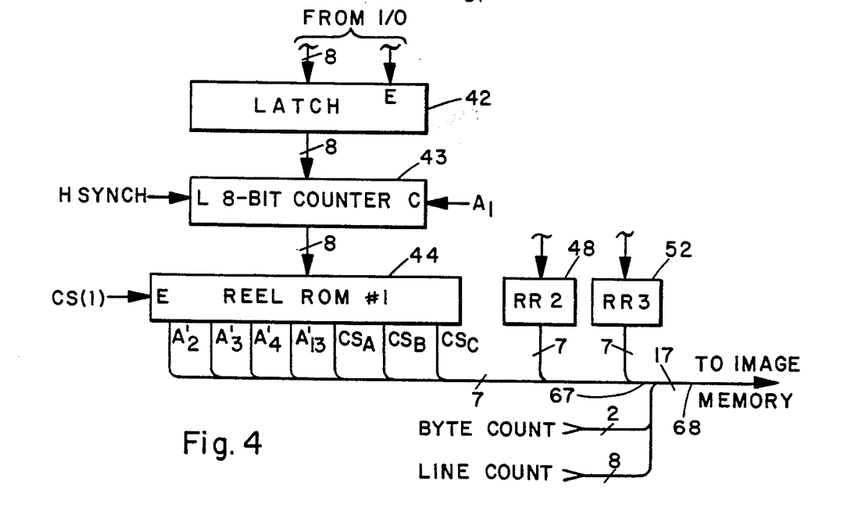
FIG. 4 is a functional block diagram illustrating in greater detail one symbol reel circuit of the FIG. 2 diagram.

The symbol reel circuit comprising the latch 42, counter 43, and reel ROM 44 is illustrated with finer detail in FIG. 4. The structure and operation of this symbol reel circuit are identical to the structure and operation of the other two symbol reel circuits. Therefore, the following description of the first symbol reel circuit also describes the other two. As illustrated, the latch 42 receives the signal RSA 1, comprising eight parallel data bits and one latch enabling bit, corresponding to a REEL SELECT signal, from the expander 34. The enable bit is directed only to the latch 42 and permits the eight parallel RSA 1 data bits to be latched to the latch 42. The eight latched bits are used to set the initial count of the 8-bit counter 43 on the leading edge of HSYNCH so that the initial count will be available to the symbol reel ROM 44 prior to the scanning of each line of the video device 16. The count in the counter is incremented by A1, available from the counter 62, which changes state eight times during the scanning of a horizontal line on the video device 16, and which is therefore equivalent to HSYNCH/8 of FIG. 2. The current count of the counter 43 is provided to the address (A) port of the reel ROM 44. The ROM 44 contains 256 separately addressable storage spaces, each containing seven bits of information. The seven bits are labelled $A'_2$, $A'_3$, $A'_4$, $A'_{13}$, $CS_A$, $CS_B$, and $CS_C$, respectively, and have functions described further below. The seven bits provided from the currently-addressed space of the ROM 44 are output onto a 7-bit wide common bus 67, to which the reel ROM's 48 and 52 are likewise connected. The signals conducted on the bus 67 comprises the SYMBOL ADDRESS signals of FIG. 2. The BYTE COUNT signals, comprising $A_0$ and $A_1$ output by the counter 62, and the LINE COUNT signals, comprising $A_5$-$A_{12}$ output by the counter 62, together with the bus 67 form a 17-bit wide bus 68 which is connected to the symbol memory 54, illustrated in greater detail in FIG. 5.

Figures 5, 6:
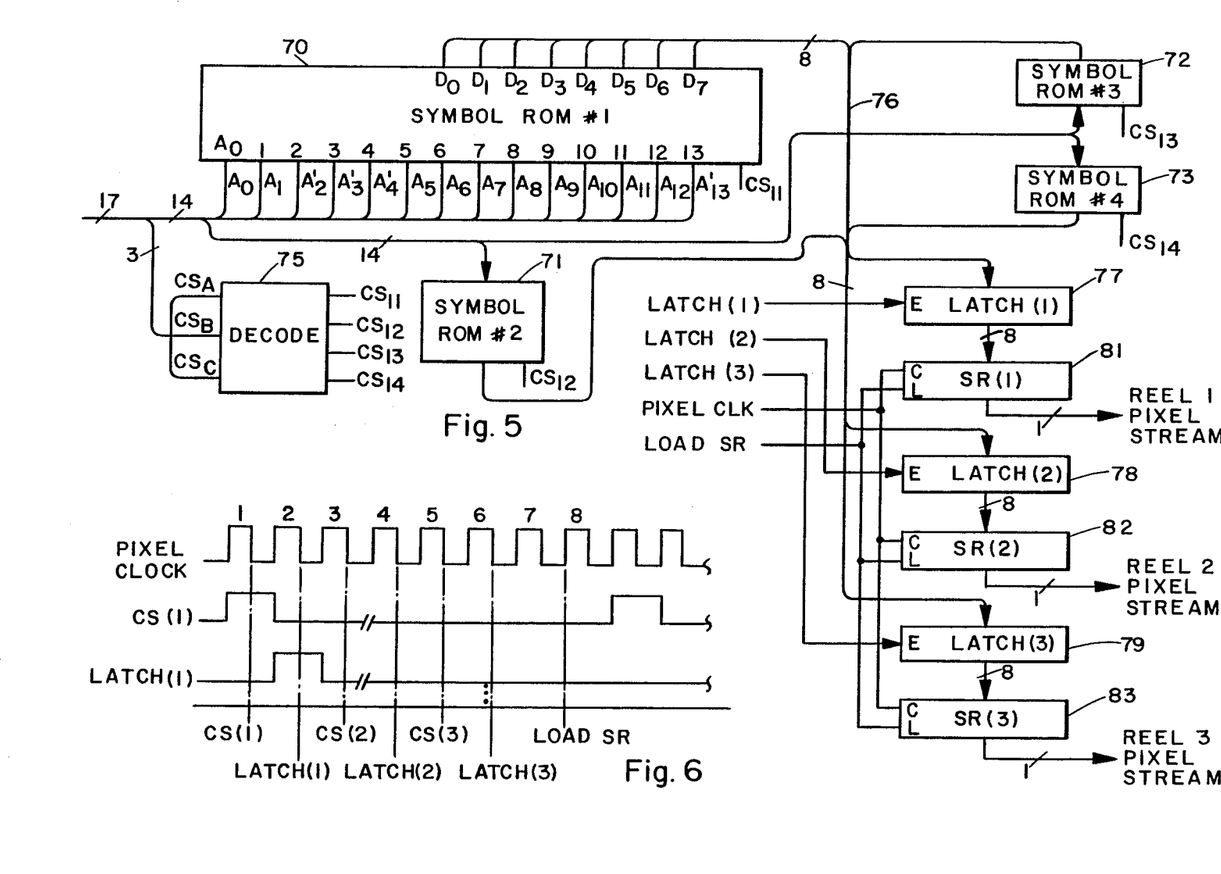
FIG. 5 is a functional block diagram illustrating in greater detail the symbol memory of the FIG. 2 diagram and its interconnection with circuitry which stages and routes symbol signal streams to each of the video displays of the invention.
FIG. 6 is a timing diagram illustrating how the timing and synchronization circuit synchronizes the operations of various elements presented in the FIG. 2 block diagram.

Referring now to FIG. 5, the symbol memory 5A of FIG. 2 comprises at least four conventional ROM's 70-73, which are labelled symbol ROM's, and a conventional decoder 75. The fourteen signal paths of the bus 68 conducting the signals $A_0$, $A_1$, $A'_2$-$A'_4$, $A_5$-$A_{12}$, and $A'_{13}$ are provided as the address inputs to the four symbol ROM's 70-73 with $A_0$-$A'_4$ constituting a byte address portion and $A_5$-$A_{12}$, a line address portion. These signals are connected to the address ports of each of the symbol ROM's in the manner illustrated in detail in FIG. 5 by the connections to the ROM 70. The three lines of the bus 68 conducting the signals $CS_A$-$CS_C$ are fed to the select ports of the decoder 75 which is conventionally configured to provide a single one of four chip select signals, CS(11)-CS(14), depending upon the condition of the signals $CS_A$-$CS_C$.

Each of the symbol ROM's 70-73 provides eight parallel bits (one byte) of data stored in an addressable storage space defined by the fourteen bits of address data present at the address ports whenever the chip select ($CS_{XX}$) signal for that ROM is enabled. The eight bits of data are conducted on a common byte-wide data bus 76 to the input ports of one of three latches 77-79, the latch of entry being determined by the state of one of the three signals, LATCH(1)-LATCH(3). Latched data are transferred from the latches 77-79 to parallel-to-serial shift registers 81-83 when the LOAD SR signal is enabled. Following loading of the shift registers, the eight bits of data stored in each register are shifted out by the PIXEL CLOCK signal, one bit at a time, to form three pixel streams which are fed to the I ports of the video devices 16, 18, and 20, respectively.

In the preferred embodiment, the video devices 16-20 have conventional CRT display screens which, as illustrated in FIG. 1A, are rotated 90 degrees from normal so that the horizontal sweep is vertical and the vertical sweep is horizontal. This aligns what is normally the horizontal aspect of a non-rotated screen with the vertical rolling of the gaming symbols which the screen displays. Therefore, in the description which follows, it will be evident that the memory maps of the reel ROM's and the symbol ROM's have been configured to adapt the provision of symbol pixels to this nonconventional orientation of the video device displays.

With reference now to FIGS. 3-6, the synchronized access to the reel and symbol ROM's can be understood. In FIG. 6, a portion of the PIXEL CLOCK waveform is illustrated showing eight consecutive clock oscillations numbered 1-8. These eight oscillations are illustrative of a sequence of states which occurs in the reel ROM chip select signals CS(1)-CS(3), the latch signals LATCH(1)-LATCH(3), and the LOAD SR signal. Thus, in the first of the eight consecutive oscillations of PIXEL CLOCK, CS(1) is enabled, which permits the reel ROM 44 to output the seven bits of information stored in the addressable space currently accessed by the output of the counter 43. This causes the reel ROM 44 to place seven bits of information on the bus 67, with the $CS_A$-$CS_C$ signals decoded by the decoder 75 to select one of the symbol ROM's 70-73. The selected symbol ROM will output eight bits of data from the space defined by the address bits on the other fourteen lines of the bus 68. At the second of the eight PIXEL CLOCK cycles, LATCH(1) is enabled which will latch the eight bits output by the selected symbol ROM into the latch 77. Similarly, on PIXEL CLOCK cycles 3 and 4, CS(2) and LATCH(2), respectively, will occur, causing a symbol ROM to be selected by an output from the reel ROM 48 and eight bits of addressed data to be latched into the latch 78. Finally, on PIXEL CLOCK pulses 5 and 6, CS(3) and LATCH(3), respectively, will toggle, prompting the reel ROM 52 to cause eight bits of data to be entered from the symbol memory 54 into the latch 79. Then, on the final of the eight PIXEL CLOCK cycles the LOAD SR signal will cause each of the shift registers 81-83 to load the bytes of data held in the latches 77-79, respectively. Then, the sequential access of the symbol memory 54 to obtain three more parallel bytes of data will be repeated while the three load bytes of data will be clocked out in parallel from the registers 81-83.

The memory map of a reel ROM, illustrated in FIG. 7, includes addressable storage space divided into 32 consecutive symbol sectors, each containing address data defining a respective gaming symbol stored as described below in the symbol memory 54. Effectively, then, each reel ROM has a memory which corresponds to a rotating mechanical reel with 32 symbol positions on it.

Figure 8:
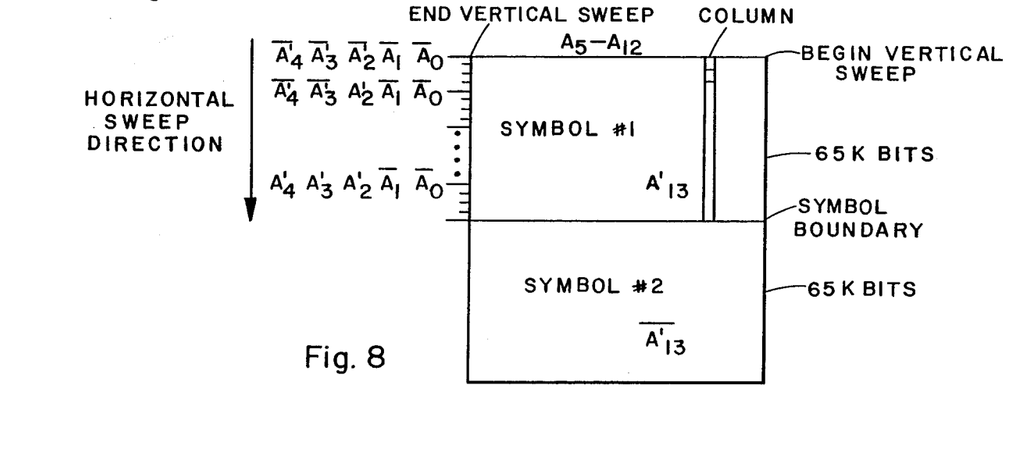
FIG. 8 is a memory map illustrating the principal contours of symbols signals stored in the symbol memory device of FIG. 2.

In the preferred embodiment, there are eight symbols which may reside in random arrangement on each reel. Each symbol consists of 65,536 bits in a 256×256 pixel configuration. Preferably, each of the symbol ROM's 70-73 consists of a conventional 128K addressable storage device; therefore, two symbols can be stored in each of the symbol ROM's. The outline of the symbol signal storage in a representative symbol ROM is illustrated in FIG. 8, where a first symbol, designated as symbol #1, is in the first 65K bits, and a symbol #2 is in the second 65K bits. When a symbol ROM is addressed, the address bit $A'_{13}$, output by the currently-selected reel ROM, indicates which symbol ROM sector, and thus, which symbol, is to be read out. Since, as stated above, the scanning of the video output devices has been rotated by 90°, it is most efficient to associate each symbol ROM column with a respective video horizontal line and to extract the symbol pixels from a symbol ROM along the columns. Therefore, the bits $A_5$-$A_{12}$ from the counter 62 (the line address portion) which count the horizontal lines in a frame are used to address the column of pixels which is associated with the current horizontal sweep indicated by the bits. In the preferred embodiment, the columns are addressed in FIG. 8 from the right-hand margin, where the vertical sweep marking the beginning of a frame of a video device CRT begins, to the left-hand margin, where the vertical sweep ends.

The pixels contained in an addressed symbol column are obtained from the symbol ROM in consecutive bytes by a byte address portion consisting of the bits $A'_4$-$A'_2$, $A_1$ and $A_0$, which sequentially address bytes in the column identified by $A_5$-$A_{12}$. The address bits $A'_4$-$A'_2$ form the most significant bits (MSB's) of the byte address. The byte address MSB's are provided by a respective reel ROM, are incremented (or decremented, depending upon the selected addressing direction) by the associated reel ROM counter eight times between each HSYNCH signal, and so divide an addressed column into eight equal segments of 32 pixels each. Between each respective count of the byte address MSB's, the byte address LSB's $A_1$ and $A_0$, which are incremented by the counter 62 every eight cycles of PIXEL CLOCK, identify the byte of pixels to be output by the selected symbol ROM.

Returning once again to FIG. 7, the simulation of a rotating symbol sequence by the apparatus of the invention can be understood. It will be recalled that the address provided to a reel ROM is determined at the beginning of a video frame by the initial setting of its associated 8-bit digital counter. It will also be recalled that that initial count will be counted up or down by eight during each horizontal scan line so that, for each horizontal scan during a frame, eight consecutive addresses in a reel ROM will be accessed. Since the initial count of the counter is changed in its associated latch only once every frame, the same eight addressable spaces will be accessed sequentially 256 times each frame.

Figure 7:
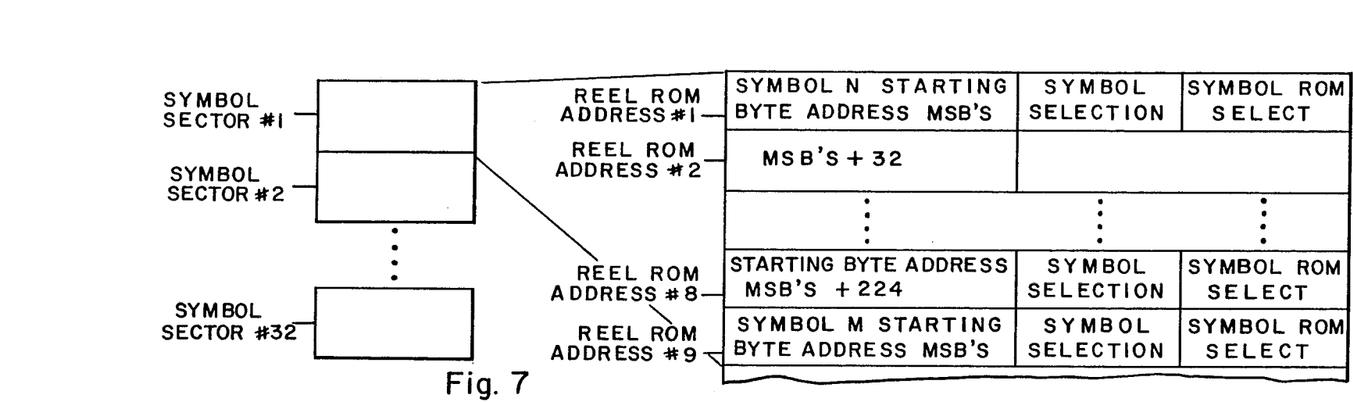
FIG. 7 is a memory map illustrating the principal contours of the data stored in a symbol reel memory device.

As shown in FIG. 7, each addressable reel ROM space contains the symbol ROM byte address MSB's $A'_4$-$A'_2$, the ROM symbol selection bit $A'_{13}$ and the symbol ROM select coding bits $CS_A$-$CS_C$. Therefore, in each of the 32 reel symbol sectors, there are eight consecutively addressable spaces containing information which identifies a symbol ROM, select a symbol in the identified ROM, and sequentially increment the horizontal address MSB's.

It should be evident that when the processor 30, at the beginning of the frame provides the first reel ROM address in one of the 32 reel sectors, for example, reel ROM address #1 in FIG. 7, a single symbol centered in the screen of a video device will be presented during that frame, since the symbol addresses sequentially provided by the reel ROM will start with the byte address starting MSB's.

If, on the next succeeding frame, the processor 30 provides reel ROM address #2 to a latch, the effect will be to move the symbol displayed in the preceding frame vertically on the video device screen by one eighth of a frame. Additionally, since the counter associated with the latch will count from reel ROM address #2 to reel ROM address #9 for each horizontal scan, the bottom eighth of the video device screen will contain the top eighth of the symbol identified by reel sector #2, which begins at reel ROM address #9 in FIG. 7. Thus, if the processor 30 increments the reel starting address provided to each respective latch 42, 46 and 50 by a count of one each frame, the effect will be to scroll the symbols in a symbol reel vertically across the screen of the video device, scrolling the reel by one eighth of the horizontally-swept screen area each frame.

Figure 9:
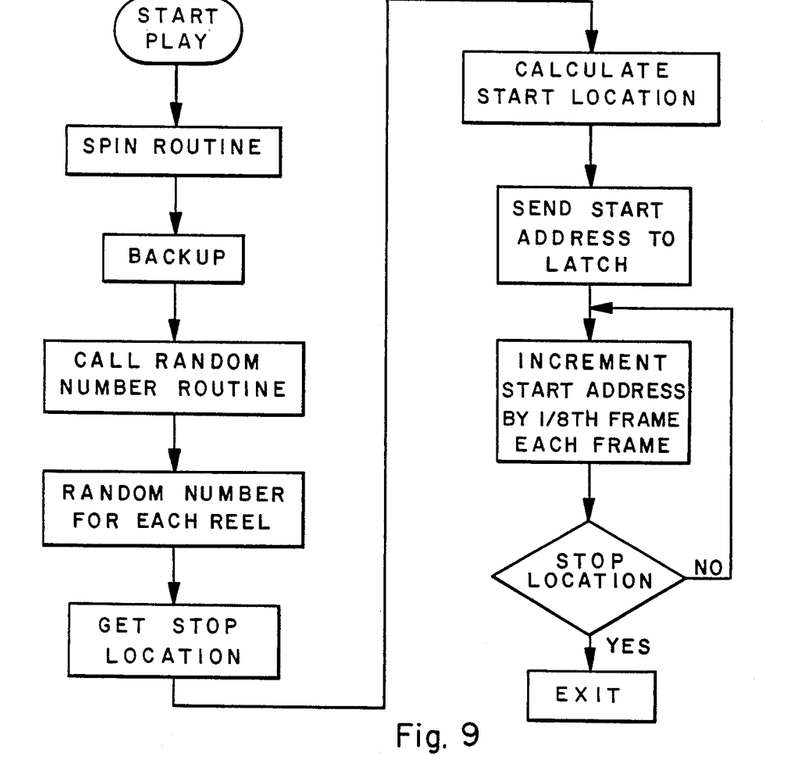
FIG. 9 is a flow diagram illustrating the procedure implemented by the processor of FIG. 2 in initiating, controlling, and terminating the rotating symbol sequences presented by the video displays during a gaming attempt played on the FIG. 1A slot machine.

FIG. 9 is a flow diagram illustrating a procedure implemented by a program entered conventionally into the processor system 30 to control the operation of the FIG. 2 apparatus. Before a play is initiated, and while the machine 10 is operational, the three symbols that ended the preceding gaming attempt will be displayed on the screens of the devices 16–20. When a player drops one or more coins into the slot 12, the coin sensor 36 will provide a signal to the processor 30 which will prompt it to watch for a play sensing signal. When the player depresses the play switch 14 the sensor 38 will provide the play sensing signal to the processor 30 which will start a play by calling a SPIN routine. At the beginning of the SPIN routine the currently-displayed symbols will be moved by one eighth of a frame in a direction opposite the spin direction. At the same time that the displayed symbols are moved back, the processor 30 calls a random number routine which can comprise any well-known pseudo-random number generation algorithm. The random number routine is executed three times to obtain a random number for each of the three symbol reels simulated on the video displays 16–20.

For each of the symbol reels, the respective random number selected will be used to determine a stopping location in the 32-symbol reel of the respective reel ROM. In the preferred embodiment, this is done by dividing the result of a random number sequence by 32 and using the remainder to obtain an associated entry on a 32-location lookup table. The table contains the reel ROM addresses which define the first addressable location in each reel ROM symbol sector. This ensures that when the symbol reel rotation is stopped, a single symbol will be fully displayed.

Next, a symbol reel starting location is determined based upon the pseudo-randomly-selected stopping symbol. In the preferred embodiment, a symbol reel starting location is based upon a predetermined amount of time of symbol sequence rotation. In a preferred embodiment, the symbol sequence on the display 16 is scrolled for two seconds, the sequence on the display 18 for three seconds, and the display 20 sequence is scrolled for four seconds. Thus, assuming a conventional frame rate of 60 per second, the processor 30 will count back 120 reel ROM locations from the pseudo randomly-selected reel ROM address accessing the byte starting address MSB's for the stopping symbol. Since eight frames are consumed in moving each symbol vertically across the display 16, the 120 reel ROM address locations mean that a total of 15 consecutive symbols of the 32-symbol reel contained in the ROM 44 will be scrolled across the screen of the display 16.

Similarly, for the second symbol reel circuit, the processor 30 will back up 180 address locations from the stopping address selected for the reel ROM 48, which corresponds to scrolling 25 symbols on the screen of the video device 18. Finally, 30 symbols will be scrolled from start to stop on the screen of the display device 20.

Once the start location has been calculated for each of the reel ROM's 44, 48 and 52, the respective reel start address is provided to the associated latch before the beginning of a frame, enabling the displays 16, 18 and 20 all to display their starting figures and rotate their symbol reels in synchronism.

Once the initial reel start addresses have been placed in their respective latches, processor 30 will respond to each succeeding frame signal by incrementing each of the last three reel starting addresses by one count and latching the respective incremented address in each latch prior to the beginning of the indicated frame. As explained above, incrementing the initial reel ROM address each frame by one effectively increments the symbol memory starting address by 32 bits or one eighth of a frame which, as explained, scrolls the symbols and simulates the rotation of a mechanical symbol reel.

The processor 30 will increment each reel starting address by one each frame until the starting address of the respective stopping symbol is reached, at which time the stopping symbol starting address will be latched. Since the reel ROM address corresponding to the stopping symbol starting address remains unchanged until another play is initiated, each display will continue to present its respective stopping symbol resulting from the last play until another play is initated.

It should be evident now that the last play stopping symbols can be moved vertically in the direction opposite the selected scrolling direction when the SPIN routine is initiated simply by storing at some temporary location in the processor system 30 the three stopping reel ROM addresses, decrementing the addresses by one, latching the decremented addressed into the respecive symbol reel circuits and then, on the next succeeding frame, entering the starting reel ROM addresses.

Figure 10:
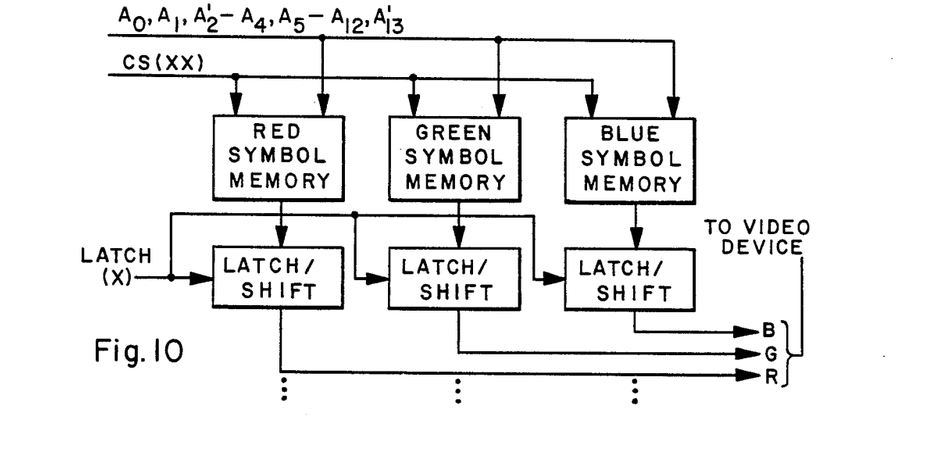
FIG. 10 is a block diagram illustrating how the symbol memory can be constructed to enable the display of colored symbols.

FIG. 10 illustrates how the above described invention can be modified by display color symbols on a conventional three-gun, color video display device. In FIG. 10, each of the symbol ROM's 70–73 is implemented by a respective set of three color ROM's, labelled RED, GREEN and BLUE SYMBOL MEMORY. Each ROM of the set contains symbol signal information having the arrangement of FIG. 8 stored so that the address bits $A_0$, $A_1$, $A'_2$–$A'_4$, $A_5$–$A_{12}$, and $A'_{13}$ access, in each color ROM, symbol signals which define respective chromatic portions of the same symbol. Each of the latch/shift register pairs of FIG. 5 is replicated in triplicate so that each video device is serviced by three latch/shift register pairs, each for routing a respective chromatic portion of a selected symbol portion to the correct color gun of the video device. In operation, when one symbol reel circuit is providing symbol byte addresses, the composite symbol address, including the symbol byte address, is fed to the symbol memory where one set of three color ROM's is selected by CS(XX). Then, the addressed symbol signal data is fed from the three addressed color ROM's to three latch/shift circuits by a respective LATCH signal to be fed to a video device.

It should be manifest that the above-described gaming device can be adapted to produce simulated symbol reeling on conventionally-oriented displays simply by rotating the memory map of FIG. 8 by 90 degrees. Further, although the preferred embodiment has been described in terms of three displays, its fundamenal principle can be easily implemented to simulate symbol reel rotation on more or fewer displays.

It is to be understood that the embodiment of the present invention hereinabove discussed is illustrative of an even wider variety of embodiments useful in practicing the invention. In all cases, the scope of the invention is to be interpreted as defined by the appended claims.

I claim:

1. In a video slot machine displaying plural movable symbol sequences stopped by the machine to indicate the result of a gaming attempt, the improvement comprising:

a plurality of adjacently-disposed video monitors, each responsive to a respective sequence of video symbol signals for providing a corresponding movable symbol sequence in a raster-scanned format in which multi-line video frames are consecutively displayed;

microprocessor means responsive to a gaming attempt on said video slot machine for randomly determining a plurality of stopping symbols at which to stop the movements of a plurality of movable symbol sequences and, for each of said randomly determined symbols, generating a sequence of starting addresses in which the value of a starting address is incremented by a predetermined amount once each video frame to produce the next starting address of the sequence;

a plurality of reel address storage circuits, each including a counting circuit which responds to a respective sequence of starting addresses by incrementally counting from a starting address value in the sequence at a predetermined rate for the duration of at least one of the lines of a respective video frame, and a storage device containing a set of first address portions stored in a predetermined order which provides a respective first address signal sequence including a string of first address portions in response to said incremented counting;

an addressable symbol memory in which signals corresponding to a plurality of symbols are stored and which responds to said first address signal sequence and to a second address signal sequence by providing respective sequences of video symbol signals, each of said video symbol signal sequences including video symbol signals stored at symbol memory locations addressed by the combination of a respective first address sequence and said second address signal sequence; and synchronizing and address means connected to said video monitors, said microprocessor means, and said reel address storage circuits for time-synchronizing said starting address sequences and said first address signal sequences to the raster-scanned format of said video monitors and for providing said second address signal sequence in time-synchronism with the raster-scanned format of said video display means.

2. The video slot machine of claim 1 further including a plurality of interface circuits, each responsive to said synchronizing and address means and including latching means for latching consecutive portions of a respective video symbol sequence and a shift means for serially shifting latchd symbol signals to a respective video monitor in synchronism with the raster-scanned format of said video monitor.

3. The video slot machine of claim 2 wherein the synchronizing and address means produces a pixel clock having a pixel clock rate synchronized to said raster-scanned format, and each of said latching means operates during a respective one of a group of consecutive pixel clock cycles to latch a current predetermined number of video symbol signals, said predetermined number of symbol signals equalling the number of pixel clock cycles in said group, while all of said shift means respond to said pixel clock by serially shifting respective predetermined number of video symbol signals latched during a previous group of pixel clock cycles.

4. The video slot machine of claim 1 wherein said consecutively-displayed video frames occur at a predetermined frame rate and each said sequence of starting address signals is provided at said frame rate.

5. The video slot machine of claim 4 wherein said microprocessor means increments a respective starting address by an address amount corresponding to the vertical displacement of a symbol displayed on a video monitor by a predetermined distance.

6. The video slot machine of claim 1 wherein a respective first address portion included in a first address signal sequence includes data identifying a respective set of symbol signals stored in said symbol storage means that corresponds to a specific symbol.

7. The video slot machines of claim 1 wherein a respective first address portion included in a first address signal sequence includes data identifying a respective addressable sector of said symbol memory where a plurality of video symbol signals corresponding to a respective symbol are stored.

8. The video slot machine of claim 1 wherein said raster-scanned format includes a sequence of lines that are presented at a predetermined line rate and said second address signal sequence includes signals corresponding to the lines of said raster-scanned format that change at said predetermined line rate.

9. The video slot machine of claim 8 wherein each of said counting circuits incrementally counts at a predetermined rate that is a multiple of said line rate.

10. A method for displaying a plurality of apparently-rotating symbol sequences on a set of adjacent, raster-operating video display devices included in a video slot machine having an addressable symbol memory, in which each symbol sequence is displayed in a raster-scanned format consisting of consecutively-displayed multi-line video frames on a respective one of said video display devices in response to a sequence of video symbol signals, comprising the steps of:

storing plural sets of video symbol signals in addressable storage space in said symbol memory, each of said sets corresponding to a respective video symbol;

generating a plurality of respective first address portion sequences at a first rate synchronized with the raster-scan operations of said video display devices, each of said first address portion sequences corresponding to a specific sequence of symbols;

generating a second address portion sequence at a second data rate synchronized with the raster-scan operations of said video display devices, said second address portion sequence including a succession of second address portions which, when combined with a respective first address portion sequence, produces a symbol memory address sequence that defines a predetermined succession of video symbol signals stored at correspondingly-addressed locations in said symbol memory;

combining each of said first address portion sequences with said second address portion sequence to produce a plurality of symbol memory address sequences; and providing said plurality of symbol memory address sequences to said symbol memory to produce a plurality of corresponding video symbol signal sequences synchronized with the raster-scan operations of said video display devices.

11. The method of claim 10 further including the step of interfacing said symbol signal sequences with said video display devices by latching successive portions of each symbol signal sequence and serially shifting latched symbol signal sequences concurrently to said video display devices in synchronism with the raster-scanned operations of said video display devices.

12. The method of claim 11 wherein said step of generating said symbol select sequences includes generating said sequences in response to a predetermined frequency characteristic of said raster-scanned format.

13. the method of claim 12 wherein said predetermined frequency characteristic is a frame rate.

14. The method of claim 11 wherein said step of generating said single address portion sequence includes generating said single address portion sequence in response to a predetermined frequency characteristic of said raster-scanned format.

15. The method of claim 14 wherein said predetermined frequency characteristic is a line rate.

16. The method of claim 10 further including the steps of:

randomly determining a plurality of stopping symbols at which to stop the movements of said apparently-rotating symbol sequences; and for each of said randomly-determined symbols, providing a respective sequence of rotation signals indicative of apparent rotation of a respective symbol sequence;

and, wherein said step of generating includes generating each of said respective symbol select sequences in response to a respective rotation signal sequence.

* * * * *